United States Patent
Kotzian et al.

[11] Patent Number: 5,308,596
[45] Date of Patent: May 3, 1994

[54] PROCESS FOR THE PRODUCTION OF CRYSTALLINE SODIUM DISILICATE IN AN EXTERNALLY HEATED ROTARY KILN HAVING TEMPERATURE ZONES

[75] Inventors: Michael Kotzian; Günther Schimmel, both of Erftstadt; Alexander Tapper, Mönchengladbach; Knut Bauer, Kelkheim-Hornau, all of Fed. Rep. of Germany

[73] Assignee: Hoechst Aktiengesellschaft, Frankfurt am Main, Fed. Rep. of Germany

[21] Appl. No.: 986,983

[22] Filed: Dec. 8, 1992

[30] Foreign Application Priority Data

Dec. 21, 1991 [DE] Fed. Rep. of Germany ....... 4142711

[51] Int. Cl.$^5$ .............................................. C01B 33/32
[52] U.S. Cl. .................................... 423/333; 423/334; 252/135
[58] Field of Search ....................... 423/332, 334, 333; 252/135

[56] References Cited

U.S. PATENT DOCUMENTS

| | | | |
|---|---|---|---|
| 3,838,192 | 9/1974 | Bertorelli et al. | 423/334 |
| 3,956,467 | 5/1976 | Bertorelli | 423/332 |
| 4,806,327 | 2/1989 | Rieck et al. | 423/332 |
| 5,183,651 | 2/1993 | Schimmel et al. | 423/334 |
| 5,211,930 | 5/1993 | Schimmel et al. | 423/333 |

FOREIGN PATENT DOCUMENTS

| | | |
|---|---|---|
| 0293640 | 12/1988 | European Pat. Off. . |
| 0425428 | 5/1991 | European Pat. Off. . |
| 0502325 | 9/1992 | European Pat. Off. . |
| 4031848 | 5/1991 | Fed. Rep. of Germany . |
| 9108171 | 6/1991 | World Int. Prop. O. .......... 423/333 |

OTHER PUBLICATIONS

Perry's Chemical Engineers' Handbook (6th Ed.), Green & Maloney (ed), 1984, pp. 20-29 to 29-38.

*Primary Examiner*—Olik Chaudhuri
*Assistant Examiner*—Ken Horton
*Attorney, Agent, or Firm*—Connolly & Hutz

[57] ABSTRACT

To prepare crystalline sodium disilicates having a laminar structure, a molar ratio of $SiO_2$ to $Na_2O$ of (1.9 to 2.1) 1 and a water content of less than 0.3% by weight, a water glass solution is first obtained by reacting sand with sodium hydroxide solution in a molar ratio of $SiO_2$ to $Na_2O$ of (2.0 to 2.3) : 1 at temperatures of 180° to 240° C. and pressures of 10 to 30 bar. This water glass solution having at least 20% by weight of solids is treated in a spray drier with hot air at 200° to 300° C. with the formation of a pulverulent amorphous sodium disilicate having a water content (determined as loss on heating at 700° C.) of 15 to 23% by weight and a bulk density of at least 300 g/l. The spray-dried pulverulent, amorphous sodium disilicate is ground. The ground sodium disilicate is introduced into a rotary kiln equipped with devices for moving solids, externally heated via the wall and having in its interior a plurality of different temperature zones, and is treated therein at temperatures of 400° to 800° C. for 1 to 60 minutes with formation of crystalline sodium disilicate.

5 Claims, 1 Drawing Sheet

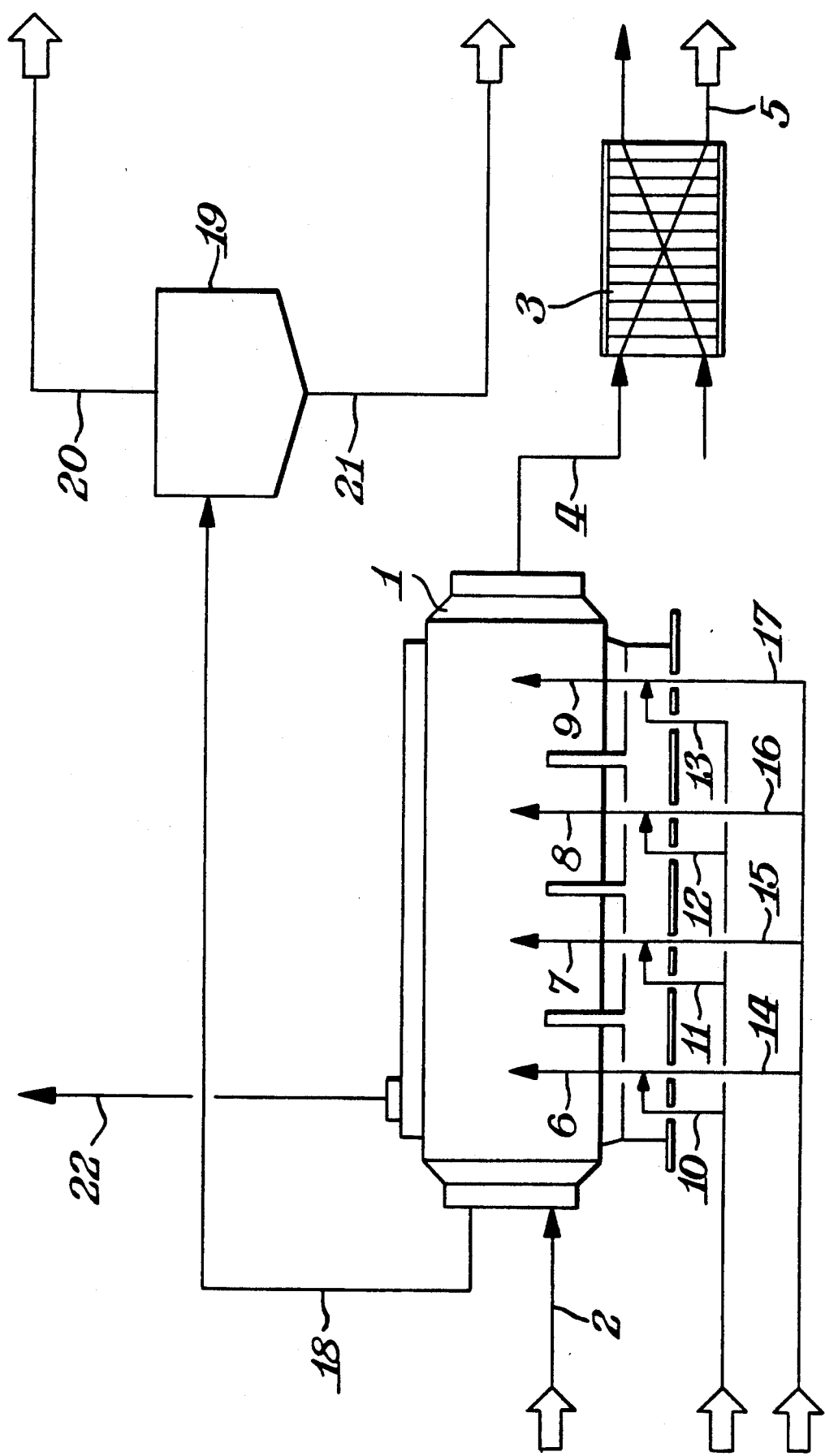

PROCESS FOR THE PRODUCTION OF CRYSTALLINE SODIUM DISILICATE IN AN EXTERNALLY HEATED ROTARY KILN HAVING TEMPERATURE ZONES

FIELD OF THE INVENTION

The present invention relates to a process for the preparation of crystalline sodium disilicates having a laminar structure, a molar ratio of $SiO_2$ to $Na_2O$ of (1.9 to 2.1) : 1 and a water content of less than 0.3% by weight from a water glass solution obtained by reacting sand with sodium hydroxide solution in a molar ratio of $SiO_2$ to $Na_2O$ of (2.0 to 2.3) : 1 at temperatures of 180° to 240° C. and pressures of 10 to 30 bar, having at least 20% by weight of solids, and spray-drying the water glass solution with hot air at 200° to 300° C. with the formation of a pulverulent amorphous sodium disilicate having a water content (determined as loss on heating at 700° C.) of 15 to 23% by weight and a bulk density of more than 300 g/l.

BACKGROUND OF THE INVENTION

German Offenlegungsschrift 4,031,848 discloses a process for the preparation of crystalline sodium silicates having a laminar structure, a molar ratio of $SiO_2$ to $Na_2O$ of (1.9 to 2.1) : 1 and a water content of less than 0.3% by weight from a water glass solution having at least 20% by weight of solids. In this case the water glass solution is obtained by reaction of quartz sand with sodium hydroxide solution in the molar ratio of $SiO_2$ to $Na_2O$ of (2.0 to 2.3) : 1 at temperatures of 180° to 240° C. and pressures of 10 to 30 bar. This water glass solution is treated in a spray drying zone with hot air at 200° to 300° C. with formation of a pulverulent amorphous sodium silicate having a water content (determined as loss on heating at 700° C.) of 15 to 23% by weight and a bulk density of more than 300 g/l. The pulverulent, amorphous, water-containing sodium silicate is introduced into an inclined rotary kiln equipped with devices for moving solids and is treated therein with flue gas at temperatures of more than 500° to 850° C. for 1 to 60 minutes in counter-current flow with formation of crystalline sodium silicate. Finally, the crystalline sodium silicate leaving the directly heated rotary kiln is comminuted with the aid of a mechanical crusher to particle sizes of 0.1 to 12 mm.

A disadvantage of the known process is the difficult establishment of a reproducible temperature profile in the rotary kiln because of the variations of the flue gas with respect to its quantity per unit time and its temperature, by which means crystalline sodium disilicate of varying quality is produced.

SUMMARY OF THE INVENTION

It is therefore an object of the present invention to provide a process for the preparation of crystalline sodium disilicates in which sodium disilicate of uniform quality is obtained over a relatively long period of time. This is achieved according to the invention by grinding the spray-dried pulverulent, amorphous sodium disilicate; introducing the ground sodium disilicate into a rotary kiln equipped with devices for moving solids, which is heated externally via the wall and which has a plurality of different temperature zones in its interior, and treating the sodium disilicate therein at temperatures of 400° to 800° C. for 1 to 60 minutes with formation of crystalline sodium disilicate.

BRIEF DESCRIPTION OF THE DRAWING

The Figure schematically illustrates a plant for carrying out the process of the invention.

DESCRIPTION OF THE PREFERRED EMBODIMENTS

The process according to the invention can, furthermore, optionally, be designed in such a manner that a) the spray-dried, pulverulent, amorphous sodium disilicate is ground to particle sizes of 1 to 50 μm;

b) the pulverulent crystalline sodium disilicate, exiting the rotary kiln, having particle sizes of 0.1 to 12 mm is ground using a mill to particle sizes of 2 to 400 μm;

c) the ground crystalline sodium disilicate is fed to a roller compactor, by means of which it is compressed to give compacted pieces at a roller pressure of 5 to 40 kN/cm of roller width;

d) the compacted pieces are processed by mechanical comminution to give granules having a bulk density of 700 to 1000 g/l;

e) the rotary kiln, externally heated via the wall, has at least 4 different temperature zones in its interior;

f) in the first temperature zone adjacent to the entry opening 200° to 500° C. is maintained, in the second temperature zone 400° to 600° C. is maintained, in the third temperature zone 550° to 700° C. is maintained and in the fourth temperature zone adjacent to the exit opening 650° to 800° C. is maintained.

In the process according to the invention, owing to the external heating of the rotary kiln via its wall, (so-called indirect heating) a uniform transfer of heat into the sodium disilicate via the wall is achieved with better energy utilization.

The temperature control along the length of the kiln, i.e. the temperature profile, can be established exactly in the process according to the invention by means of a plurality of combustion chambers independent of each other, without changing the gas velocity in the rotary kiln. By this means it is possible to adjust more accurately the temperature range in which $\delta\text{-}Na_2Si_2O_5$ is formed and to hold this constant, so that the danger of production of undesired $\alpha\text{-}Na_2Si_2O_5$ is minimized.

Since, in the process according to the invention, no flue gas is passed through the reaction chamber of the rotary kiln, the gas velocity in this chamber is substantially lower, as a result of which only a small quantity of dust is discharged from the rotary kiln.

In the process according to the invention the hot waste gases, at about 700° C., produced from the external heating of the rotary kiln via its wall, since they do not contain any dust, can be utilized for example for drying the water glass solution in the spray-drying tower.

In the accompanying drawing, a plant for carrying out the process according to the invention is depicted diagrammatically and in section.

Spray-dried, pulverulent, amorphous sodium disilicate is introduced into a rotary kiln 1, externally heated via its wall, via a feed line 2, while at the opposite end of the rotary kiln 1, a discharge line 4 for crystalline sodium disilicate leads to a cooler 3, the cooler 3 being furnished with a filling line 5 for finished product. The double jacket of the rotary kiln 1 is subdivided into a plurality of chambers, into each of which opens a heating gas pipe (6, 7, 8, 9). In this case, each heating gas pipe (6, 7, 8, 9) is connected to an air supply pipe (10, 11, 12, 13) and a fuel supply pipe (14, 15, 16, 17), by means of which the heating gas temperature can be separately adjusted for each chamber of the double jacket of the rotary kiln 1.

From the side of the rotary kiln 1, into which the feed line 2 opens, there leads off an outgoing gas line 18, which opens into a scrubber 19, which is connected via a first line 20 to a waste gas system and via a second line 21 to a waste water treatment plane. Finally, a waste gas line 22 leads off from the upper side of the rotary kiln 1, which waste gas line can for example lead to a spray-drying tower.

EXAMPLE 1 (According to the Prior Art)

Sand (99% by weight $SiO_2$; particle size: 90% <0.5 mm) and 50% strength by weight sodium hydroxide solution in a molar ratio of $SiO_2$ to $Na_2O$ of 2.15 : 1 were placed in a nickel-clad, cylindrical autoclave equipped with a stirring device. The mixture was heated to 200° C. by injection of steam (16 bar) with the autoclave being stirred and was held for 60 minutes at this temperature. The contents of the autoclave were then flashed via a stripping vessel into a container and, after addition of 0.3% by weight of perlite as filter aid at 90° C. to precipitate the insoluble matter, were filtered via a disk pressure filter. The filtrate obtained was a clear water glass solution having a molar ratio of $SiO_2$ to $Na_2O$ of 2.04 : 1. A solids content of 45% was established by dilution with water.

The water glass solution was sprayed into a hot air spray-drying tower equipped with a disk atomizer, which spray-drying tower was heated via a gas-fired combustion chamber and was connected to a pneumatically cleaning bag filter for product separation, the combustion chamber being adjusted in such a manner that the hot gas entering at the tower head had a temperature of 260° C. The rate of the water glass solution to be sprayed was adjusted in such a manner that the temperature of the silicate/gas mixture leaving the spray-drying tower was 105° C. The residence time was calculated to be 16 seconds from the volume of the spray-drying tower and from the gas throughput through the spray-drying tower. The amorphous sodium disilicate separated off at the bag filter had a bulk density of 480 g/l with a low tendency to dust formation, an iron content of 0.01% by weight, an $SiO_2$: $Na_2O$ ratio of 2.04 : 1 and a loss on heating at 700° C. of 19.4%; its mean particle diameter was 52 μm.

60 kg of amorphous sodium disilicate was loaded per hour into a direct-fired rotary kiln (length: 5 m; diameter: 78 cm; inclination: 1.2°), which was insulated with multilayered mineral wool and a sheet metal jacket in such a manner that, for a temperature in the interior of the rotary kiln of 730° C., there was a temperature on its exterior shell of at the most 54° C. The crystalline sodium disilicate leaving the rotary kiln, which sodium disilicate contained 15% by weight of $\alpha$-$Na_2Si_2O_5$ and had a water content (determined as loss on heating at 700° C.) of 0.1% by weight, was comminuted with the aid of a mechanical crusher to a particle size of less than 6 mm and, after an intermediate cooling, was ground on a disk mill (diameter: 30 cm) at 400 min$^{-1}$ to a mean particle diameter of 110 μm, the iron content of the ground product remaining identical to that of the amorphous sodium disilicate.

The waste gas of the rotary kiln was removed by suction in the entry region for the amorphous sodium disilicate and was fed to a scrubbing tower. 5 kg of sodium disilicate were discharged per hour with the waste gas.

EXAMPLE 2 (According to the Invention)

From the water glass solution having 45% solids content was prepared, by analogy with Example 1, in the hot air spray-drying tower, amorphous sodium disilicate having a water content (determined as loss on heating at 700° C.) of 19.0% and a bulk density of 420 g/l, which, after grinding with the aid of an air jet mill to a mean particle diameter of 35 μm, had a bulk density of 630 g/l.

25 kg/h of this ground amorphous sodium disilicate were loaded into a rotary kiln (length: 5.3 m; diameter: 40 cm; inclination: 5 mm/m=0.3°) externally heated via the wall via a metering screw, the temperature in the region of the first chamber adjacent to the entry (cf. Figure) being 460° C., of the second chamber being 580° C., of the third chamber being 650° C. and finally in the region of the fourth chamber adjacent to the outlet being 690° C. In this case, there were arranged in the entry region mechanical devices, for moving solids, of such a type that encrustation of amorphous sodium disilicate in this region of the interior wall of the rotary kiln was prevented. No encrustation is formed at other parts of the interior wall of the rotary kiln or on its transport members.

The crystalline sodium disilicate discharged from the rotary kiln contained only 4% by weight of $\alpha$-$Na_2Si_2O_5$ and had a water content (determined as loss on heating of 700° C.) of 0.1% by weight; its further processing was carried out analogously to Example 1 using a crusher and disk mill.

EXAMPLE 3 (According to the Invention)

The product having a mean particle diameter of 145 μm obtained according to Example 2 was further comminuted with the aid of a fluidized bed/opposed-jet mill with a built-in mechanical screening device. Depending on the rotary speed set of the screener, a sodium disilicate was obtained, free from abraded particles, having a mean particle diameter of 2 to 15 μm and a water content of 0.14% by weight, the laminar structure remaining unchanged.

EXAMPLE 4 (According to the Invention)

The product obtained according to Example 2 was further comminuted with the aid of a porcelain-clad ball mill filled with corundum balls. A sodium disilicate, free from abraded particles, was obtained having a mean particle diameter of 5 to 14 μm, depending on the duration of grinding, the laminar structure remaining unchanged.

EXAMPLE 5 (According to the Invention)

The product obtained according to Example 2 was processed in a roller compactor at a pressure of the 5 cm-wide compacting roller of 30 kN/cm of roller width with subsequent comminution of the crusts in a sieving granulator to give dust-free granules having a mean particle diameter of 750 μm, a bulk density of 820 g/l and high stability to abrasion.

To determine the stability to abrasion, 50 g of granules were treated in a rolling ball mill (length: 10 cm; diameter: 11.5 cm; 8 steel balls having a diameter of 2 cm) for 5 minutes at a rotary speed of 100 min$^{-1}$.

After the abrasion test had been carried out, the mean particle diameter was only 615 μm, which corresponded to a decrease of 18%.

The lime-binding capacity, given in the following table, of the crystalline sodium disilicates obtained in the examples was determined by the following procedure: $CaCl_2$ solution (corresponding to 300 mg of CaO) was added to 1 l of distilled water, so that a water of 30° German hardness was obtained.

To 1 l of this water, which was heated either to 20° or 60° C., was added 1 g of the crystalline sodium disilicate obtained from the examples and 0 to 6 ml of a 1 molar glycine solution (obtained from 75.1 g of glycine and 58.4 g of NaCl, which were dissolved with water to give 1 l), whereupon a pH of 10.4 was established. The suspension was stirred for 30 minutes at the selected temperature (20° or 60° C.), during which the pH remained stable. Finally, the mixture was filtered and the calcium remaining in solution in the filtrate was determined by complexometry. The lime-binding capacity was determined by subtraction from the original content.

TABLE

| Lime-binding capacity of sodium disilicates at pH 10.4 (in mg of Ca/g of $Na_2Si_2O_5$) | | |
|---|---|---|
| Example | at 20° C. | at 60° C. |
| 1 | 82 | 132 |
| 2, 3, 4, 5 | 84 | 136 |

We claim:

1. A process for the preparation of crystalline sodium disilicates having a laminar structure, a molar ratio of $SiO_2$ to $Na_2O$ of (1.9 to 2.1) : 1 and a water content of less than 0.3% by weight, which comprises: reacting sand with sodium hydroxide solution in a molar ratio of $SiO_2$ to $Na_2O$ of (2.0 to 2.3):1 at temperature of 180° to 240° C. and pressures of 10 to 30 bar with formation of a water glass solution having at least 20% by weight of solids; spray-drying the water glass solution with hot air at 200° to 300° C. with the formation of a pulverulent amorphous sodium disilicate having a water content (determined at loss on heating at 700° C.) of 15 to 23% by weight and a bulk density of more than 300 g/l; grinding the spray-dried pulverulent amorphous sodium disilicate; introducing the ground sodium disilicate into a rotary kiln equipped with devices for moving solids, externally heated via the wall and having at least four different temperature zones in its interior, wherein in the first temperature zone adjacent to the entry opening 200° to 500° C. is maintained, in the second temperature zone 400° to 600° C. is maintained, in the third temperature zone 550° to 700° C. is maintained and in the fourth temperature zone adjacent to the discharge opening 650° to 800° C. is maintained; and treating the ground sodium disilicate in said externally heated rotary kiln for 1 to 60 minutes with formation of crystalline sodium disilicate.

2. The process as claimed in claim 1, wherein the spray-dried, pulverulent, amorphous sodium disilicate is ground to particle sizes of 1 to 50 μm.

3. The process as claimed in claim 1, wherein the pulverulent crystalline sodium disilicate having particle sizes from 0.1 to 12 mm exiting the rotary kiln is ground using a mill to particle sizes of 2 to 400 μm.

4. The process as claimed in claim 3, wherein the ground crystalline sodium disilicate is fed to a roller compactor, by means of which is compressed to compacted pieces at a roller pressure of 5 to 40 kN/cm of roller width.

5. The process as claimed in claim 4, wherein the compacted pieces are processed by mechanical comminution to give granules having a bulk density of 700 to 1000 g/l.

* * * * *